PHILIP C. FEFFER
RICHARD G. HILL
LELAND B. ZAHALKA
INVENTORS

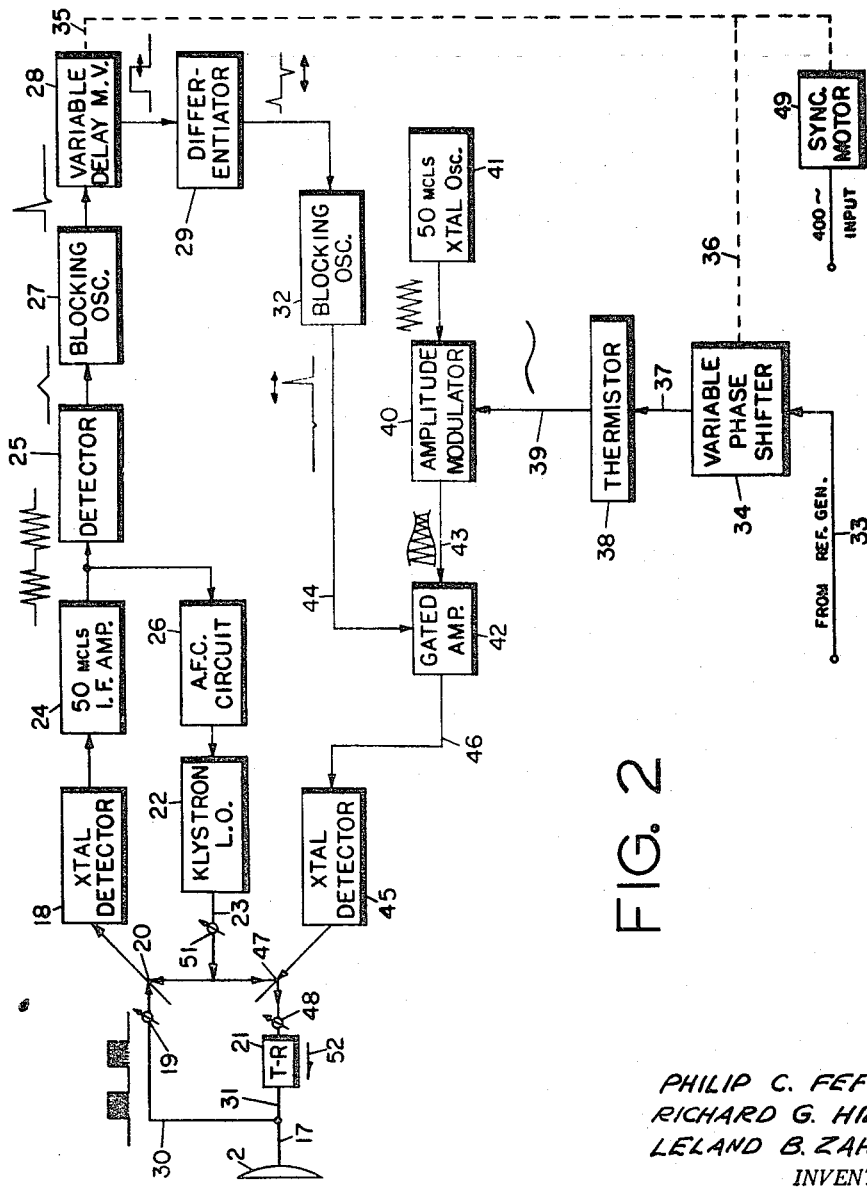

United States Patent Office 2,952,848
Patented Sept. 13, 1960

2,952,848

METHOD AND MEANS FOR TESTING THE CALIBRATION OF RADAR SYSTEMS

Leland B. Zahalka, Baltimore, and Philip C. Feffer, Baltimore County, Md., and Richard G. Hill, deceased, late of Ontario, Calif., by Clifton L. Allen, administrator, Pomona, Calif., assignors to Aircraft Armaments, Inc., Baltimore, Md., a corporation of Ohio Continuation of application Ser. No. 350,002, Apr. 21, 1953. This application Dec. 24, 1958, Ser. No. 784,416

20 Claims. (Cl. 343—17.7)

This invention relates to a method and apparatus for testing the calibration of pulse radar systems and particularly those of the conical scan type commonly used in fire control systems.

The principal use of radar is to provide information concerning the relative position and movement of a distant object. This information may be presented directly on an indicator such as a cathode ray tube or it may also be employed in a computer such as a lead angle computer to provide data for directing the guns of a fire control system. In these uses, it is obviously essential that the radar as well as the other components of the system be accurately calibrated and aligned at all times so as to provide reliable data.

An object of this invention is to provide a simple and dependable method and apparatus for dynamically testing the calibration of a radar system.

Another object of this invention is to provide a target course generator for generating an imaginary target moving in space along a selected path and at selected rates so that the radar system being tested is called upon to operate as it would in actual practice.

Still another object of this invention is to provide an apparatus which may be conveniently packaged so as to be readily portable.

Further and other objects will become apparent from a reading of the following description taken in connection with the accompanying drawings wherein like numerals refer to like parts.

In the drawings:

Figure 2 is a schematic view of the target course generator of this invention.

Figure 1:
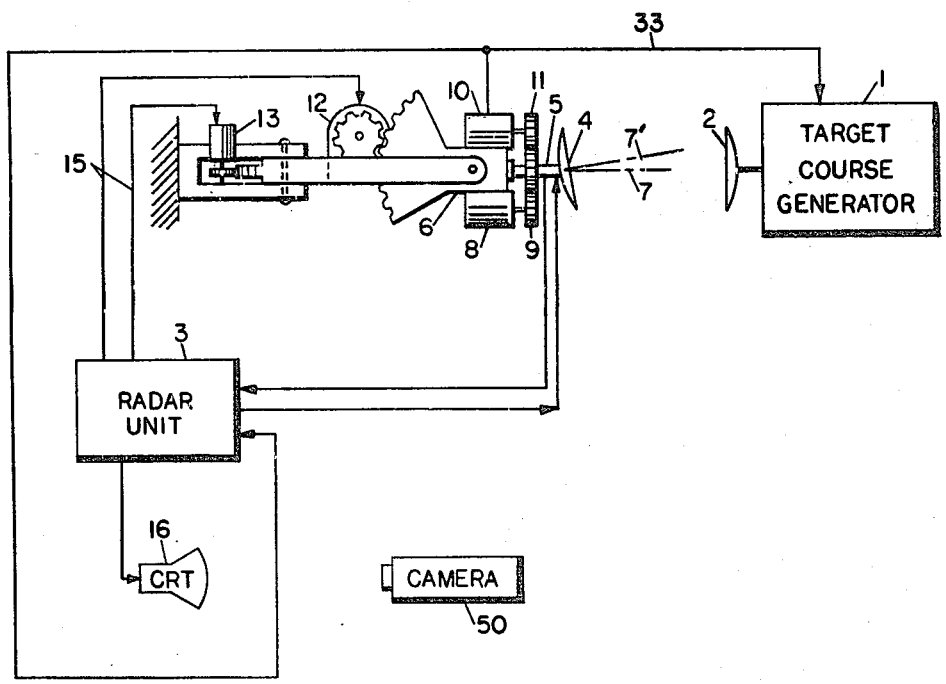
Figure 1 is a schematic view of a typical conical scan radar system in an arrangement illustrating the method of this invention.

In order to understand the operation of the target course generator as used in the method, it is necessary to understand certain features of the operation of a conical scan radar system. Therefore, such a radar system is shown schematically in Figure 1 and briefly described herein below as a part of the specification. Radar antenna 4 is carried by a shaft 5 rotatively mounted in a support 6 and is angularly offset from the axis of shaft 5 as indicated by lines 7 and 7' in Figure 1 wherein line 7 represents the centerline of shaft 5 and 7' represents the energy transmitting centerline of the antenna. Thus, by rotating shaft 5, the RF energy transmitted through antenna 4 is caused to produce a conical beam pattern. Rotation of shaft 5 is accomplished by operating spin motor 8 which is suitably mounted on support 6 and mechanically connected to the shaft through suitable gearing 9. The instantaneous position of the beam of electrical energy transmitted through antenna 4 is ascertained through the use of a reference generator 10 mounted on support 6 so as to be suitably operatively connected to shaft 5 such as by gearing 9 through gear 11. The output from reference generator 10 may be a signal voltage of sinusoidal wave form where one full wave represents 360 degrees of rotation of shaft 5. This reference generator signal is fed into radar unit 3 and compared with the amplitude and phase of reflected energy from a target to provide information for directing antenna 4 so that the target will be centered within the conical beam of RF energy. The variation in amplitude of the reflected energy indicates the magnitude of the antenna pointing error and the phase, as compared with the reference generator output, represents the direction of the error.

Support 6, as schematically shown in Figure 1, is mounted for movement in two mutually perpendicular planes whereby antenna 4 may be moved in azimuth and elevation for zeroing the pointing error An elevation drive motor 12 and azimuth drive motor 13 control the azimuth and elevation movement of the antenna in accordance with outputs 15 from radar unit 3

Radar unit 3 as shown in Figure 1 may include a computer to operate on range and rate information concerning the target to introduce corrections which are necessary for a fire control system. The resulting radar information, whether operated on by a computer or not, is employed to present graphical information concerning target position and movement on an indicator 16 such as a cathode ray tube Target course generator 1 as shown in Figure 2 includes an antenna 2 arranged to receive pulsed RF energy from the radar system The received RF energy is fed into suitable RF plumbing 17 and divided so that a major portion of the pulsed energy is directed down one leg 30 through a conventional power attenuator 19, through a hybrid waveguide junction 20 commonly known as a magic-T and finally to a crystal detector 18 The pulsed RF energy flowing in leg 31 is fed into a conventional transmit-receive (T–R) tube 21 and dissipated therein A klystron local oscillator 22 is provided in the target course generator circuit which generates a continuous wave (C.W.) signal at a frequency equal to the RF carrier frequency of the received pulse energy from the radar system plus 50 megacycles. The output 23 of local oscillator 22 is combined with the pulsed energy transmitted by the radar system in magic-T 20 and fed to detector 18. The oscillator output is beat with the RF pulsed energy of 50 megacycles having the same pulse width and repetition rate as the receiving RF energy An attenuator 51 is interposed between local oscillator 22 and magic-T 20 for controlling the power of the local oscillator output. The 50 megacycle pulsed energy from detector 18 is amplified in IF amplifier 24 and fed to a second detector 25 and also to a conventional automatic frequency control circuit 26. The output from automatic frequency control circuit 26 is fed into local oscillator 22 to provide a stabilizing influence maintaining the frequency of the local oscillator output within close limits.

Detector 25 is responsive to the 50 megacycle pulses from amplifier 24 to produce a short output pulse at the start of each 50 megacycle pulse. The short pulses from detector 25 are fed into an amplifying blocking oscillator 27 to produce constant amplitude pulses of sufficient magnitude to trigger variable delay multivibrator 28.

Triggering multivibrator 28 with the output from blocking oscillator 27 starts a generally square wave pulse, the duration of which depends upon the setting of the multivibrator. The pulse from multivibrator 28 is differentiated in differentiator 29 and the resulting signal is fed to a blocking oscillator 32 where it is inverted and clipped to produce a sharp control pulse which appears in point of time at the end of the multivibrator output pulse. Thus by varying the time delay of the multivibrator, through rotation of shaft 35, the control pulses from blocking oscillator 32 may be caused to appear at any desired time after the start of the pulses of electrical energy transmitted by the radar system.

Output 33 from reference generator 10 of the radar system is fed to target course generator 1 as shown in Figure 1 and received by a variable phase shifter 34 as shown in Figure 2. The phase of the reference generator signal is shifted as desired from 0 degrees to 360 degrees by the rotation of shaft 36. The output from phase shifter 34 is fed through lead 37 to a smoothing device 38 known as a thermistor to maintain the phase shifted output at a desired and uniformly varying amplitude. Output 39 from the smoothing device 38 is fed to an amplitude modulator 40 for amplitude modulating a 50 megacycle continuous wave (C.W.) signal generated by a crystal controlled oscillator 41. Reference generator 10 may obviously become a part of the target course generator rather than a part of the radar system. The only requirement is that the reference generator signal be synchronized with the scanner rotation.

The amplitude modulated 50 megacycle C.W. signal output from modulator 40 is fed to a gated amplifier 42 through lead 43. The control pulse output from blocking oscillator 32 is fed to gated amplifier 42 through lead 44 for controlling the gate whereby the amplitude modulated 50 megacycle signal is allowed to pass the amplifier only in response to a control pulse from the blocking oscillator so as to produce pulses, the duration of which are substantially equal to the duration of the pulses transmitted by the radar system. Since the control pulses are generated from the pulses transmitted by the radar, the repetition rate of the amplitude modulated 50 megacycle pulses from gated amplifier 42 will also be the same as the repetition rate of the radar transmitted pulses.

The pulsed output from gated amplifier 42 is fed to a crystal detector 45 through lead 46. The 50 megacycle pulsed output from detector 45 is combined with the output from local oscillator 22 in a magic-T 47. Since the local oscillator output is at a frequency equal to the RF frequency of the received pulse energy from the radar system plus 50 megacycles, when it is combined with the 50 megacycle pulsed output from detector 45 a pulsed output results which is at two frequencies, one being at the RF frequency of the received pulse energy from the radar system, the other being at the received frequency plus 100 megacycles. This output is fed through a power attenuator 48, through T–R tube 21, which allows energy to pass only in the direction of the arrow 52, and on to antenna 2 where the energy is directed towards radar antenna 4 so that it may be picked up as a simulated echo pulse from an imaginary target. The frequency of the echo pulse which is at the RF frequency plus 100 megacycles is sufficiently outside the pass band frequency of the radar so that only the RF frequency of the echo pulse is picked up.

Shaft 35 controlling variable delay multivibrator 28, and shaft 36 controlling variable phase shifter 34, are both connected to a synchronous motor 49 to vary the time delay of the control pulse and the phase of the signal from the reference generator continuously and at the desired rate so as to produce the effect of a target moving in range, azimuth and elevation along a prescribed path which may be accurately reproduced by the target course generator at any time.

The dynamic aspects of the tests performed by the disclosed system, and an explanation of how the pulses retransmitted to the radar set correspond to the signals reflected from a moving target, will now be given. As pointed out above, the principle upon which the invention is based, is a recognition that in a conical scan system utilizing a rotating antenna, a signal produced by the reflected energy from a target when compared to a signal from a reference generator synchronized with said antenna, will differ in amplitude and phase whenever the target is not centered within the conical beam of RF energy. The variation in amplitude is a measure of the magnitude of the pointing error, and the shift in phase is a measure of the direction thereof. Normally, this principle is utilized to zero the pointing error and so track a moving target. Range of the target, in such case, is indicated by the time delay as between the reflected RF energy and the output energy.

If the pointing error were not zeroed, a moving target would produce a reflected signal, which when compared to the antenna output would be delayed in time, and which when compared with the signal from the reference generator would vary in amplitude and be in phase shifted relation thereto. Thus, a moving target can be simulated by using some of the radar antenna output to produce a signal having the above described characteristics and transmitting the same to the radar set. Such a signal is produced by variable delay 28, amplitude modulator 40, and variable phase shifter 34, respectively.

Variable delay multivibrator 28 is of a conventional type which produces, in response to a trigger pulse, an essentially square pulse whose leading edge coincides with the trigger pulse, and the length of which is variable according to the setting of the multivibrator. The trailing edge of this square pulse is used to produce a trigger pulse for gated amplifier 42. Since the output of the amplifier 42 is a series of pulses having the same repetition rate as the output of the radar antenna, the delay of the pulses with respect to the antenna output may be varied by varying the setting of the multivibrator, thereby simulating pulses from a target changing in range.

The amplitude modulator 40 modulates the output of the crystal oscillator 41 in accordance with the output from the reference generator 10, so that the pulse output of gated amplifier 42 is modulated to simulate the reflected signal from a target displaced from the axis of rotation of the radar antenna 4. When the amplitude of the modulation is constant, the signal received by antenna 4 appears to be that from a target moving in azimuth at a constant rate.

Variable phase shifter 34 shifts the phase of the modulating signal applied to modulator 40, thereby shifting the phase of the output of gated amplifier 42 with respect to the output of the reference generator 10. Since the amount of this phase shift is related to the angular position of the target in a plane normal to the axis of rotation of antenna 4, a continuous shift in phase of the output of amplifier 42 simulates the reflected signal from a target which is changing its angular position in such a plane.

Programming of a target may be accomplished, therefore, by changing the amount of modulation in modulator 40 to change the pointing error; by increasing or decreasing the length of the square wave produced by multivibrator 28 to cause the target to appear to move toward or away from the antenna 4; or by varying the phase shift introduced by phase shifter 40 to vary the apparent angular position of the target around the axis of rotation of the antenna. Any particular path may be selected by properly relating the variations introduced, the particular configuration shown in Figure 2 of the drawing being intended to continuously lengthen and shorten the pulse output of multivibrator 28 to cause the target to appear to approach and then recede from the antenna, while the phase of the output of amplifier 42 is continuously shifted to cause the target to appear to rotate around the axis of rotation of antenna 4, thus producing a signal output at antenna 2 which simulates the reflection from a target which approaches and recedes while traveling a spiral path. Any other preselected path may be programmed by suitably varying the amplitude of the modulation effected by modulator 40, the amount of delay introduced by the multivibrator 28, and the rate of phase shift in the variable phase shifter 34.

In the practice of the method, the following procedure is followed. At a time when the radar system is properly adjusted, target course generator 1 is located relative to the radar system so that its antenna 2 is supported closely adjacent radar antenna 4 for receiving a portion of the pulsed energy transmitted by the radar system when operating. A camera 50 or other suitable recording device is arranged relative to the target position indicator 16 for making a permanent recording of the data presented on the indicator. The radar system is then turned on so as to operate in the normal manner, transmitting RF energy. A portion of the RF energy is picked up by antenna 2 of the target course generator and employed therein as previously described to produce a pulsed output that is radiated from antenna 2 and picked up by radar antenna 4 as simulated echo pulses. The path of the target as indicated on indicator 16 is recorded by camera 50. Then at a subsequent time, when it is desired to test the calibration of the radar system, the target course generator is again arranged adjacent radar antenna 4 as herinbefore described and is caused to generate an imaginary target moving in range azimuth and elevation along the same path as before by controlling the rotation of shafts 35 and 36 in the same manner through the operation of motor 49. The path of the moving target as presented on indicator 16 is compared with the prior path recorded by the camera. This comparison may be made by making a transparent or translucent overlay from the original photographic negative and placing it over the face of the radar indicator or the indicator may again be photographed and the negative thus made compared with the negative made when the radar system was known to be properly adjusted. If the paths as presented by the indicator are similar, the radar system is properly calibrated and adjusted. If the indicated paths are different, the radar system is not functioning properly and maintenance is required so that the recorded path will again be duplicated.

The method hereinbefore described provides a dynamic test for checking the calibration of radar systems whereby the operation of all components of the system are investigated while functioning under the same conditions encountered in actual practice.

Though oscillators 22 and 41 in the target course generator are described as having specific output frequencies, it is merely by way of example and is not intended to limit the invention since any frequency in the general range of those specified will be equally satisfactory so long as the frequency of the output signal from oscillator 41 is substantially the same as the frequency difference between the output from local oscillator 22 and the received RF signal.

It is to be understood that certain modifications, substitutions and alterations may be made without departing from the spirit and scope of the invention as defined by the appended claims.

This application is a continuation of application Serial No. 350,002, filed April 21, 1953 (now abandoned).

What is claimed is:

1. A test set of the type used to calibrate range in a radar set comprising: means to receive a radar pulse from a radar set, means including a first oscillator to convert said radar pulse to an IF pulse, means to convert said IF pulse to a video pulse, means to convert said video pulse to a trigger pulse delayed in time with respect to said radar pulse, means including a second oscillator responsive to said delayed trigger pulse to produce a pulse having the same delay as said delayed trigger pulse and substantially the same frequency as said IF pulse, means including said first oscillator to convert said delayed IF pulse to an artificial echo radar pulse delayed in time with respect to said radar pulse and substantially the same frequency as said radar pulse, and means to transmit said artificial echo radar pulse.

2. In combination, means to receive an RF input pulse, means including a first oscillator to convert said RF input pulse to an IF input pulse, means to convert said IF input pulse to a video pulse, means to convert said video pulse to a trigger pulse delayed in time with respect to said RF input pulse, means including a second oscillator and responsive to said delayed trigger pulse for producing an IF output pulse having substantially the same delay as said delayed trigger pulse and the same frequency as said IF input pulse, and means to convert said delayed IF output pulse to an RF output pulse delayed in time with respect to said RF input pulse and substantially the same frequency.

3. A radar test set comprising first means to convert an RF radar pulse to an IF pulse, means to convert said IF pulse to a video pulse, means responsive to said video pulse for producing a trigger pulse delayed in time with respect to said RF radar pulse, a continuous wave oscillator having an output of the same frequency as that of said IF pulse, means responsive to said delayed trigger pulse to convert said output to a delayed IF pulse, and second means including a part of said first means to convert said delayed IF pulse to an RF echo pulse of substantially the same frequency as said RF radar pulse.

4. A target course generator for testing the calibration of an object tracking radar system having directional antenna means for transmitting and receiving pulsed electrical energy and means responsive to the time delay between transmitted and received pulses and to the phase and amplitude of the envelope of said received pulses to determine target range, azimuth and elevation movement comprising: an oscillator generating a continuous wave signal, means including variable phase shifting means generating a modulating signal at a phase depending upon said variable phase shifting means, modulating means responsive to said modulating signal for modulating said continuous wave signal, control pulse generating means including variable time delay means responsive to pulses transmitted by said radar system for producing control pulses delayed in time from the radar pulses by an amount depending upon said variable time delay means, gating means connecting with the output from said modulating means and responsive to said control pulses for intermittently passing the modulated continuous wave signal to produce simulated echo pulses and means for transmitting said simulated echo pulses to said radar system to produce an imaginary target moving in range according to the control of said time delay means and in azimuth and elevation according to the control of said variable phase shifting means.

5. A target course generator for testing the calibration of a conical scan radar system having a directional antenna mounted for rotational movement so as to direct a cone shaped beam of pulsed electrical energy outwardly therefrom and a reference generator responsive to the rotational movement of said antenna to produce an output signal voltage varying in accordance with the antenna movement whereby to provide means for determining the instantaneous position of said beam comprising: receiving means for receiving said pulsed electrical energy, control pulse generating means including variable delay means electrically connected to said receiving means and responsive to said pulsed electrical energy for generating control pulses, said control pulses being delayed in time relative to said electrical energy pulses by an amount depending upon the setting of the variable delay means, an oscillator for generating a continuous wave signal, a variable phase shifter responsive to the output signal from the reference generator and having an output signal similar thereto in wave form and out of phase with said reference generator output by an amount depending upon the setting of said phase shifter, modulating means for amplitude modulating the output signal from said oscillator with the output signal from said phase shifter to provide an amplitude modulated continuous wave signal, the envelope of which is shifted out of phase with the reference generator signal by the operation of said phase shifter, transmitting means for transmitting said amplitude modulated signal so as to be received by said radar system, gating means interposed between said transmitting means and said modulating means and responsive to said control pulses for controlling the passage of said amplitude modulated signal to produce pulses at substantially the same repetition rate as said pulsed electrical energy transmitted by said radar system to provide simulated echo pulses representing reflections from an imaginary object, the position of which relative to said radar system antenna depending upon the control of said phase shifter and said delay means.

6. A target course generator for testing the calibration of an object tracking radar system having directional antenna means for transmitting and receiving pulsed electrical energy and means responsive to the pulse time, phase and amplitude of the received energy for determining the location and movement of an object comprising: an oscillator for generating a constant amplitude continuous wave signal, a signal generator including variable phase shifting means generating a second continuous wave signal at a phase depending upon the setting of said phase shifting means, modulating means responsive to said oscillator and to said signal generator for amplitude modulating the oscillator output with said second continuous wave signal, receiving means for receiving said pulsed electrical energy from the radar system, control pulse generating means including variable time delay means electrically connected to said receiving means and responsive to said pulsed electrical energy for generating control pulses delayed in time from the pulses in said pulsed electrical energy by an amount depending upon the setting of said variable time delay means, gating means connecting with the output from said modulating means and responsive to said control pulses to pass the output from said modulating means as pulses starting with each control pulse, and transmitting means responsive to the pulsed output from said gating means for transmitting the pulsed output to said radar system as simulated echo pulses from an imaginary target moving in range according to the control of said time delay means and in azimuth and elevation according to the control of said variable phase shifting means.

7. A target course generator for testing the calibration of an object tracking radar system having directional antenna means for transmitting and receiving pulsed electrical energy and means responsive to the time delay between transmitted and received pulses and to the phase and amplitude of the envelope of the received pulses to determine target location and movement comprising: receiving means for receiving said pulsed electrical energy transmitted by said radar system, oscillating means generating an output signal at a frequency different from the frequency of the radar pulse carrier frequency, said receiving means being responsive to said oscillating means output to produce pulses at a carrier frequency equal to the frequency difference between the oscillating means output frequency and the radar pulse carrier frequency, control pulse generating means including variable time delay means responsive to said receiving means for producing control pulses delayed in time from the radar transmitted pulses by an amount depending upon the setting of said variable time delay means, oscillating means generating a continuous wave signal at a frequency substantially equal to the frequency difference between the radar pulse carrier frequency and the output frequency of the first mentioned oscillating means, a signal generator generating a reference signal, variable phase shifting means responsive to said signal generator for producing a second continuous wave signal at a phase relative to said reference signal depending upon the setting of said phase shifting means, modulating means responsive to the last mentioned oscillating means and to the output from said phase shifting means for amplitude modulating the output from said last mentioned oscillating means with said second continuous wave signal, gating means connecting with the output from said modulating means and responsive to said control pulses for passing the output from said modulating means intermittently as pulses beginning in point of time with each control pulse, and transmitting means responsive to the pulsed output from said gating means and from the output of said first mentioned oscillating means for transmitting to said radar system a pulsed output at the frequency of the radar pulse carrier frequency representing simulated echo pulses from an imaginary target moving in range according to the control of said time delay means and in azimuth and elevation according to the control of said variable phase shifting means.

8. A target course generator for testing the calibration of an object tracking radar system having directional antenna means for transmitting and receiving pulsed electrical energy and means repsonsive to the phase and amplitude variation of the received energy for determining the location of an object comprising: receiving means for receiving pulsed electrical energy transmitted by the radar system, control pulse generating means electrically connected to said receiving means and responsive to said pulsed energy transmitted by the radar system for generating control pulses, an oscillator generating a constant amplitude continuous wave signal, signal generating means including a variable phase shifter generating a second continuous wave signal, the phase of which relative to a reference phase depends upon the setting of said variable phase shifter, modulating means responsive to the oscillator output and to the output from said phase shifter for amplitude modulating the oscillator output, time variable gating means electrically connecting with the output from said modulating means and responsive to said control pulses to intermittently pass the output from said modulating means whereby to produce an electrical pulse train, the envelope of which varies in amplitude and phase in accordance with said second continuous wave signal to provide simulated echo pulses of an imaginary target moving in space, and transmitting means responsive to the output from said gating means for transmitting said electrical pulse train so as to be received by said radar system whereby said system is caused to respond according to the phase and amplitude of the received energy from said course generator and indicate a moving target.

9. A target course generator for testing the calibration of a conical scan pulse radar system having a directional antenna mounted for rotational movement about air axis offset from the antenna axis and a reference generator producing a voltage proportional to the instantaneous rotational position of said antenna relative to a zero reference position comprising: an antenna arranged to receive electrical pulses transmitted by said radar system, variable pulse delay means electrically connected to said last mentioned antenna and responsive to said transmitted pulses for generating control pulses delayed in time from said transmitted pulses by an amount depending upon the setting of said pulse delay means, an oscillator generating a continuous wave signal, means including a variable phase shifter responsive to the output from said reference generator and having an output phase shifted with respect to said reference generator output by an amount depending upon the setting of said phase shifter, modulator means responsive to the oscillator output and the output from said phase shifter for amplitude modulation of said oscillator output, gating means electrically connecting with the modulator output and responsive to said control pulses for passing the modulator output intermittently as simulated echo pulses at a repetition rate equal to the control pulse repetition rate, and transmitting means responsive to the output from said gating means for transmitting said simulated echo pulses to said radar system to produce an indication of an imaginary target the position of which relative to said radar system being determined by the control of said variable pulse delay means and the control of said variable phase shifter.

10. A target course generator for testing the calibration of an object tracting radar system having directional antenna means for transmitting and receiving pulsed electrical energy and means responsive to the phase and amplitude variation of the received energy for determining the location of an object comprising: receiving means for receiving pulsed electrical energy transmitted by the radar system, an oscillator generating a constant amplitude continuous wave signal, signal generating means including a variable phase shifter generating a second continuous wave signal, the phase of which relative to a reference phase depends upon the setting of said variable phase shifter, modulating means responsive to the oscillator output and to the output from said phase shifter for amplitude modulating the oscillator output, time variable gating means electrically connecting with the output from said modulating means and responsive to said receiving means to intermittently pass the output from said modulating means whereby to produce an electrical pulse train, the envelope of which varies in amplitude and phase in accordance with said second continuous wave signal to provide simulated echo pulses of an imaginary target moving in space, and transmitting means responsive to the output from said gating means for transmitting said electrical pulse train so as to be received by said radar system whereby said system is caused to respond according to the phase and amplitude of the received energy from said course generator and indicate a moving target.

11. The method of testing the calibration of an object tracking radar system having a graphical position indicator and energy transmitting and receiving means for determining target range, azimuth and elevation movement comprising: generating energy simulating an echo signal from a target moving in range, azimuth and elevation along a selected path, transmitting said energy so as to be received by said radar system for producing an indication of target movement on said graphical indicator, placing a translucent overlay having the known correct presentation marked thereon on said graphical indicator, and comparing the known correct presentation with the presentation on the radar indicator.

12. The method of testing the calibration of an object tracting radar system having a graphical indicator, energy transmitting and receiving means and means responsive to the energy transmitting and receiving means for presenting target movement on said graphical indicator comprising: generating energy simulating an echo signal from a target moving in range, azimuth and elevation along a selected path, transmitting said energy so as to be received by said radar system for producing an indication of target movement on said graphical indicator when said radar system is properly calibrated, photographing said graphical indicator to provide a record of the presentation on a photographic negative, making an overlay from said photographic negative, then generating, when the calibration of said radar system is to be checked, energy simulating an echo signal from a target moving in range, azimuth and elevation along the previously selected path, transmitting said energy so as to be received by said radar system for producing an indication of the target movement on said graphical indicator and placing said reverse negative overlay on said graphical indicator and comparing the path indicated thereon with the path recorded on said reverse negative.

13. The method of testing the calibration of a radar system having a graphical position indicator and energy transmitting and receiving means for determining target range, azimuth and elevation movement comprising: transmitting a radar signal, utilizing said signal to produce an echo signal simulating a target moving in range, azimuth and elevation along a preselected path, transmitting said echo signal so as to be received by the receiving means of said radar system for producing an indication of target movement on said graphical indicator, placing on said graphical indicator an overlay having the known correct presentation marked thereon, and comparing the known correct presentation with the presentation on the radar indicator.

14. The method of testing the calibration of a radar system having a graphical position indicator and energy transmitting and receiving means for determining the range of a moving target comprising: transmitting radar energy, utilizing said energy to produce an echo signal simulating a target moving in range along a preselected path, retransmitting said echo signal so as to be received by the receiving means of said radar system for producing an indication of target movement on said graphical indicator, placing on said graphical indicator an overlay having the known correct presentation marked thereon, and comparing the known correct presentation with the presentation on the radar indicator.

15. A radar test set comprising: means to receive a radar pulse from a radar set, means including a first oscillator to convert said radar pulse to an IF pulse, means to automatically tune said first oscillator to a frequency removed from the frequency of the radar pulse by an amount equal to the frequency of the IF pulse, means to detect the envelope of said IF pulse for producing a video pulse, means to convert said video pulse to a control pulse delayed in time with respect to said radar pulse, a second oscillator tuned to substantially the frequency of said IF pulse, means for combining the output of both oscillators for producing a signal at substantially the same frequency as said radar pulse, said control pulse causing said signal to be a pulse delayed in time with respect to said radar pulse by an amount equal to the delay of said control pulse, and means to transmit said signal to said radar set.

16. A radar test set comprising: means to receive a radar pulse from a radar set, a first oscillator tuned to a frequency different from that of said radar pulse, means to combine the output of said first oscillator with said radar pulse for producing an IF pulse, means to detect the envelope of said IF pulse for producing a video pulse, means to convert said video pulse to a control pulse delayed in time with respect to said radar pulse, means including a second oscillator tuned to a given frequency, means for combining the outputs of both oscillators for producing a signal at substantially the same frequency as said radar pulse, said control pulse causing said signal to be a pulse delayed in time with respect to said radar pulse by an amount equal to the delay of said control pulse, and means to transmit said signal to said radar set.

17. A radar set comprising: means to receive radar pulses from a radar set, a tunable local oscillator for producing an output at a frequency different from that of said radar pulses, means to combine the output of said local oscillator with said radar pulses for producing IF pulses at a frequency equal to the difference between the oscillator frequency and the radar pulses frequency, AFC means responsive to the frequency of the IF pulses for tuning said local oscillator such that the pulse-to-pulse frequency of the IF pulses is uniform means to detect the envelope of said IF pulses for producing video pulses in time coincidence with the radar pulses, means to convert said video pulses to control pulses delayed in time with respect to said radar pulses, signal generating means including a circuit tuned to substantially the frequency of the IF pulses, said signal generating means being responsive to said control pulses for producing simulated pulses at substantially the same frequency as said IF pulses but delayed in time with respect thereto, means to combine said simulated pulses with the output of said local oscillator for producing simulated radar pulses at substantially the same frequency as said radar pulses but delayed in time with respect thereto, and means to transmit said simulated radar pulses to said radar set.

18. The method of testing the calibration of a radar system having (1) transmitting means for directing energy toward a moving target, (2) receiving means for determining the range, azimuth and elevation of a target from the transmitted energy that is reflected from the object, and (3) an indicator connected with said receiving means for displaying the range, azimuth and elevation as indicia representative of the path of the target comprising the steps of: (1) generating electrical energy according to a preselected program for simulating an echo signal from an object changing range, azimuth and elevation in a manner determined by the preselected program; (2) applying said electrical energy to said receiving means and indicator so that the latter displays indicia representative of a target changing range, azimuth and elevation; and (3) ascertaining the calibration of the radar system by observing the relationship between the displayed range, azimuth and elevation and the range, azimuth and elevation determined by the preselected program.

19. The method of testing the calibration of a radar system having (1) transmitting means for directing energy toward a moving target, (2) receiving means for determining the range, azimuth and elevation of a target from the transmitted energy that is reflected from the object and (3) an indicator connected with said receiving means for displaying the range, azimuth and elevation as indicia representative of the path of the target comprising the steps of: (1) generating electrical energy similar to the energy which would be reflected from an object changing range, azimuth and elevation in a preselected manner as it moves in a preselected path, (2) applying said electrical energy to said receiving means and indicator when the radar system is properly calibrated so that the indicator displays calibration indicia representative of the preselective path, (3) making a record of said calibration indicia, (4) generating again the energy as in step (1) and applying the same to said receiving means and indicator when the calibration of the radar system is to be checked so that the indicator displays indicia representative of the path of a target, and (5) ascertaining the calibration of the radar system by observing the relationship between the displayed indicia representative of the path of the target and the recorded calibration indicia.

20. The method of testing the calibration of a radar system having (1) transmitting means for directing energy toward a moving target, (2) receiving means for determining the range, azimuth and elevation of a target from the transmitted energy that is reflected from the object and (3) an indicator connected with said receiving means for displaying the range, azimuth and elevation as indicia representative of the path of the target comprising the steps of: (1) transmitting energy from said system, (2) utilizing said energy to produce echo energy according to a preselected program for simulating an echo signal from an object changing range, azimuth and elevation in a manner determined by the preselected program, (3) applying said echo energy to said receiving means and indicator so that the latter displays indicia representative of a target changing range, azimuth and elevation, and (4) ascertaining the calibration of the radar system by observing the relationship between the displayed range, azimuth and elevation and the range, azimuth and elevation determined by the preselected program.

References Cited in the file of this patent

UNITED STATES PATENTS

| | | |
|---|---|---|
| 2,440,253 | Dodington | Apr. 27, 1948 |
| 2,477,485 | Jacob | July 26, 1949 |
| 2,477,585 | Dodington | Aug. 2, 1949 |
| 2,489,251 | Anast | Nov. 29, 1949 |
| 2,522,541 | Saxton et al. | Sept. 19, 1950 |
| 2,706,773 | Dodington | Apr. 19, 1955 |
| 2,708,148 | Clark | May 10, 1955 |
| 2,757,285 | Forbes | July 31, 1956 |

FOREIGN PATENTS

| | | |
|---|---|---|
| 593,539 | Great Britain | Oct. 20, 1947 |

UNITED STATES PATENT OFFICE
CERTIFICATE OF CORRECTION

Patent No. 2,952,848                      September 13, 1960

Leland B. Zahalka et al.

It is hereby certified that error appears in the printed specification of the above numbered patent requiring correction and that the said Letters Patent should read as corrected below.

Column 10, line 62, after "uniform" insert a comma.

Signed and sealed this 11th day of April 1961.

(SEAL)
Attest:

ERNEST W. SWIDER
Attesting Officer

ARTHUR W. CROCKER
Acting Commissioner of Patents